US006517365B1

(12) United States Patent
Bungo et al.

(10) Patent No.: US 6,517,365 B1
(45) Date of Patent: Feb. 11, 2003

(54) WIRING ASSEMBLY FOR SUPPLYING POWER TO A SLIDING DOOR

(75) Inventors: Edward M. Bungo, Cortland, OH (US); Anthony Joseph Corso, Struthers, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/568,828

(22) Filed: May 11, 2000

(51) Int. Cl.[7] .................................................. B60J 5/06
(52) U.S. Cl. ....................................... 439/162; 296/155
(58) Field of Search ........................... 296/155; 49/360; 174/72 A; 439/34, 162

(56) References Cited

U.S. PATENT DOCUMENTS 4,862,640 A * 9/1989 Boyko et al. ................. 49/213
5,877,936 A * 3/1999 Nishitani et al. ............. 439/34
6,009,671 A * 1/2000 Sasaki et al. ................. 49/352
6,076,883 A * 6/2000 Labonde et al. ............ 296/155
6,107,570 A * 8/2000 Suzuki et al. ............. 174/72 A
6,161,894 A * 12/2000 Chapman .................... 296/155
6,176,715 B1 * 1/2001 Buescher .................... 439/162
6,321,489 B1 * 11/2001 Murofushi ................... 49/630

* cited by examiner

*Primary Examiner*—Neil Abrams
(74) *Attorney, Agent, or Firm*—Thomas N. Twomey

(57) ABSTRACT

A vehicle wiring assembly 10 for supplying power to a sliding door 8 even when the door 8 is open. The assembly 10 includes a wire bundle 12 having a first end 14 attached to the vehicle and a second end 16 attached to a predetermined position on the sliding door 8. The assembly 10 also includes a spring mechanism 18 attached at one end to the vehicle and at the other end to the wire bundle 12 at a position spaced from the first end 14 of the wire bundle. The basic assembly also includes a bundle guide 20, 20' disposed along the wire bundle 12 between the spring mechanism 18 and the second end 16 of the wire bundle 12, where the bundle guide 20, 20' slidably supports the wire bundle 12 as it extends from the vehicle to the door 8. The bundle guide 20, 20' attaches to the vehicle adjacent the sliding door 8.

14 Claims, 5 Drawing Sheets

34
8

10
54
52
20'
16
14
56
50
22
38
18
36

54
14
56
52
8
50
12
20'
38
18
36
16
22

WIRING ASSEMBLY FOR SUPPLYING POWER TO A SLIDING DOOR

TECHNICAL FIELD

The subject invention relates to wiring assemblies for vehicles, and more particularly to wiring assemblies extending from a vehicle to a sliding door mounted on the vehicle.

BACKGROUND OF THE INVENTION

Vehicle makers have long-appreciated the benefits of providing power to sliding doors of the type that are commonly used in vans. This is important in the event that the maker wants to provide lighting or other power accessories in the door. Commonly, the sliding door will have internal wiring that terminates at one end in the lighting or other accessory. At the other end, the wiring terminates in a pressure contact plunger. This is shown in FIG. 2. When the door is closed, the contact plunger mates within a contact pad assembly mounted on the vehicle in the door frame. This arrangement is satisfactory, but it could be improved in several respects. First, the door only gets power when it is closed. When it is open, the plungers disengage the pads and no power travels to the door. Second, the arrangement depends on critical alignments that, if missing, can prevent the door from closing, or lead to breaking the plungers. Also, the plungers are exposed to the environment, making them susceptible to corrosion.

SUMMARY OF THE INVENTION AND ADVANTAGES

A wiring assembly for a vehicle having a sliding door includes a wire bundle having a plurality of cords, where the wire bundle extends from a first end that is adapted to attach to the vehicle, to a second end that is adapted to attach to a predetermined position on the sliding door. The assembly also includes a spring mechanism having a first end attached to the wire bundle at a position spaced from the first end of the wire bundle, the spring mechanism also having a second end adapted to attach to the vehicle. The basic assembly also includes a bundle guide disposed along the wire bundle between the spring mechanism and the second end of the wire bundle, where the bundle guide slidably supports the wire bundle, the bundle guide being adapted to attach to the vehicle adjacent the sliding door.

This type of arrangement improves upon the prior art design in several respects. First, it provides power to the sliding door even when the door is open. Second, it removes the need to ensure that plungers and pads align properly. Third, it further removes the need to have metal parts exposed to the environment. Finally, the assembly allows for the use of a continuous cable extending from the vehicle to the door, which facilitates the use of fiber optic cables in addition to or in lieu of electrical cables that might extend from the vehicle into the door.

FIGURES IN THE DRAWINGS

The present invention will now be described, by way of example, with reference to the accompanying drawings, in which:

FIGS. 9A and 9B are side views of different types of rollers that might be used with the cable support.

DESCRIPTION OF THE PREFERRED EMBODIMENT

Figure 1:
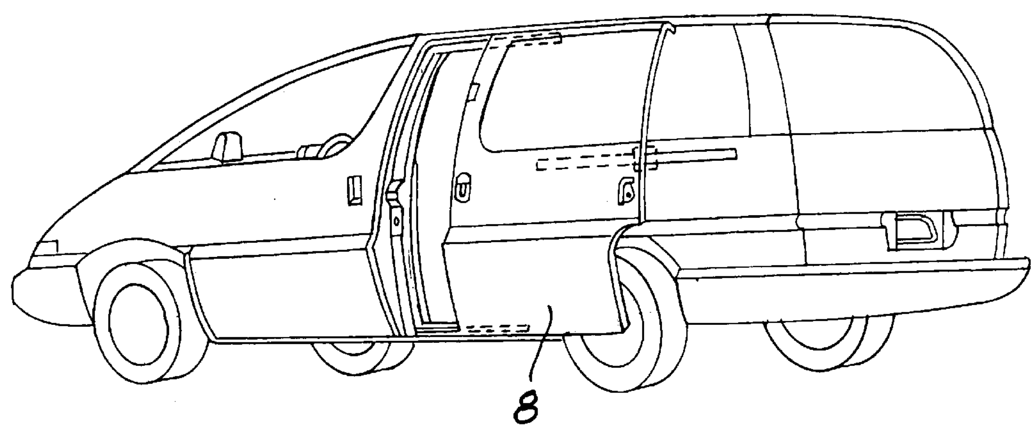
FIG. 1 is a perspective view of a vehicle having a sliding door.
Figure 4:
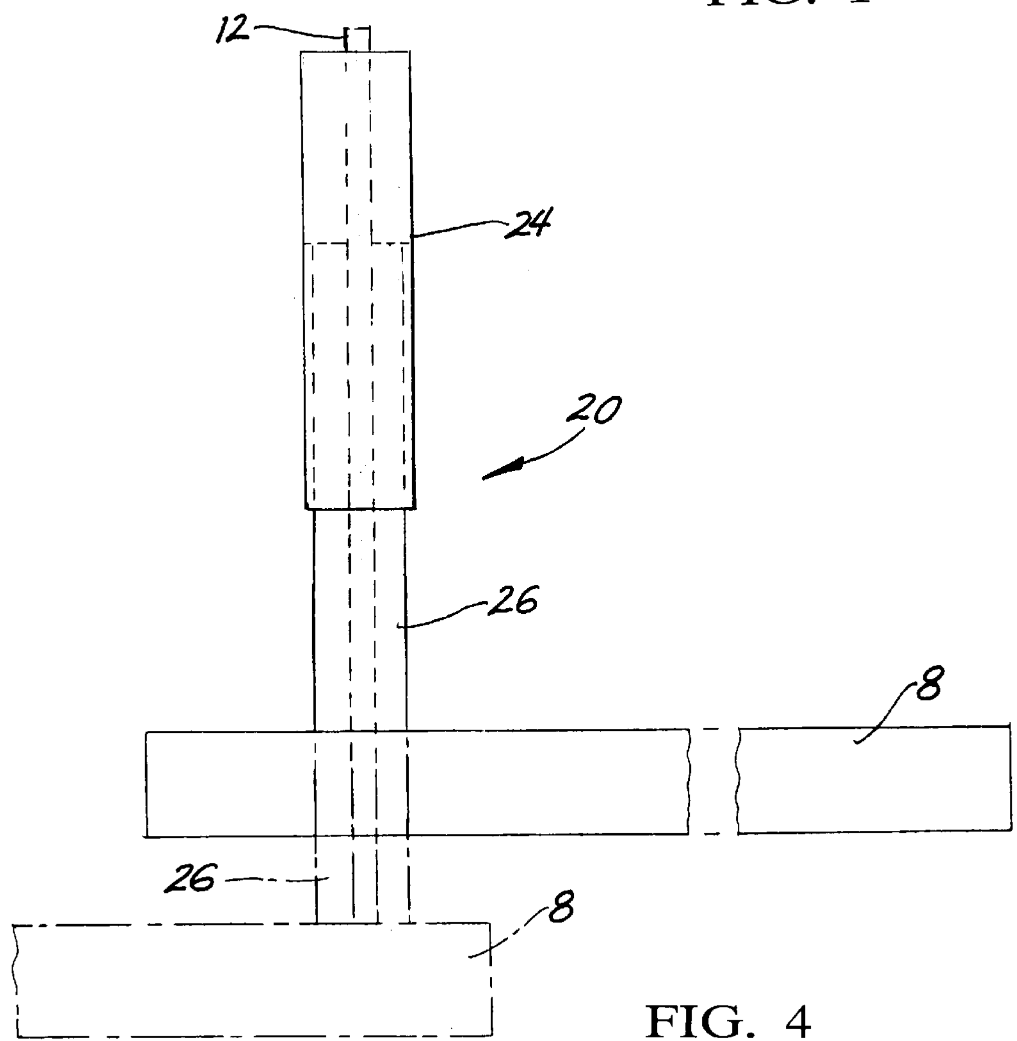
FIG. 4 is a plan view of a portion of the embodiment shown in FIG. 3.
Figure 2:
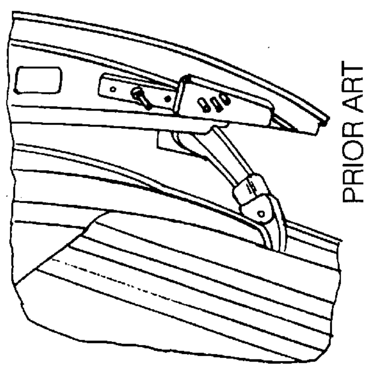
FIG. 2 is a perspective view of a prior art arrangement for conducting power into the sliding door.

Referring to the FIGS. wherein like numerals indicate like or corresponding parts throughout the several views, a wiring assembly for a vehicle having a sliding door 8 is generally shown at 10.

The wiring assembly 10 first includes a wire bundle 12 having a plurality of cords. The wire bundle 12 extends from a first end 14 that is adapted to attach to the vehicle, to a second end 16 that is adapted to attach to a predetermined position on the sliding door 8. The assembly 10 also includes a spring mechanism generally shown at 18 having a first end attached to the wire bundle 12 at a position spaced from the first end 14 of the wire bundle, the spring mechanism 18 also having a second end adapted to attach to the vehicle. The basic assembly 10 also includes a bundle guide generally shown at 20, 20' disposed along the wire bundle 12 between the spring mechanism 18 and the second end 16 of the wire bundle. The bundle guide 20, 20' slidably supports the wire bundle 12 as the bundle extends from the vehicle to the door. The bundle guide 20, 20' is adapted to attach to the vehicle adjacent the sliding door 8.

The wire bundle 12 can include a variety of wires and cables. For example, the bundle 12 can include electrical cables to supply power to the door 8 for purposes of powering various accessories. An accessory is generally represented at 22. Also, the wire bundle 12 could include fiber optic wires or cables to provide lighting to certain parts of the door—like the outside door handle, for example.

Figure 5:
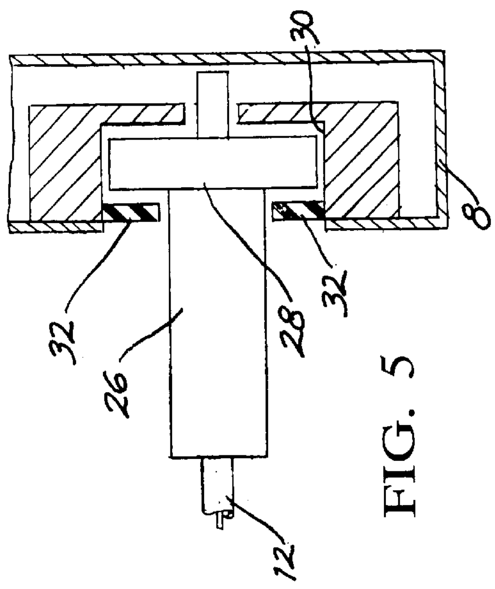
FIG. 5 is a side view of a portion of the embodiment shown in FIG. 3 with the sliding door partially cut away.
Figure 3:
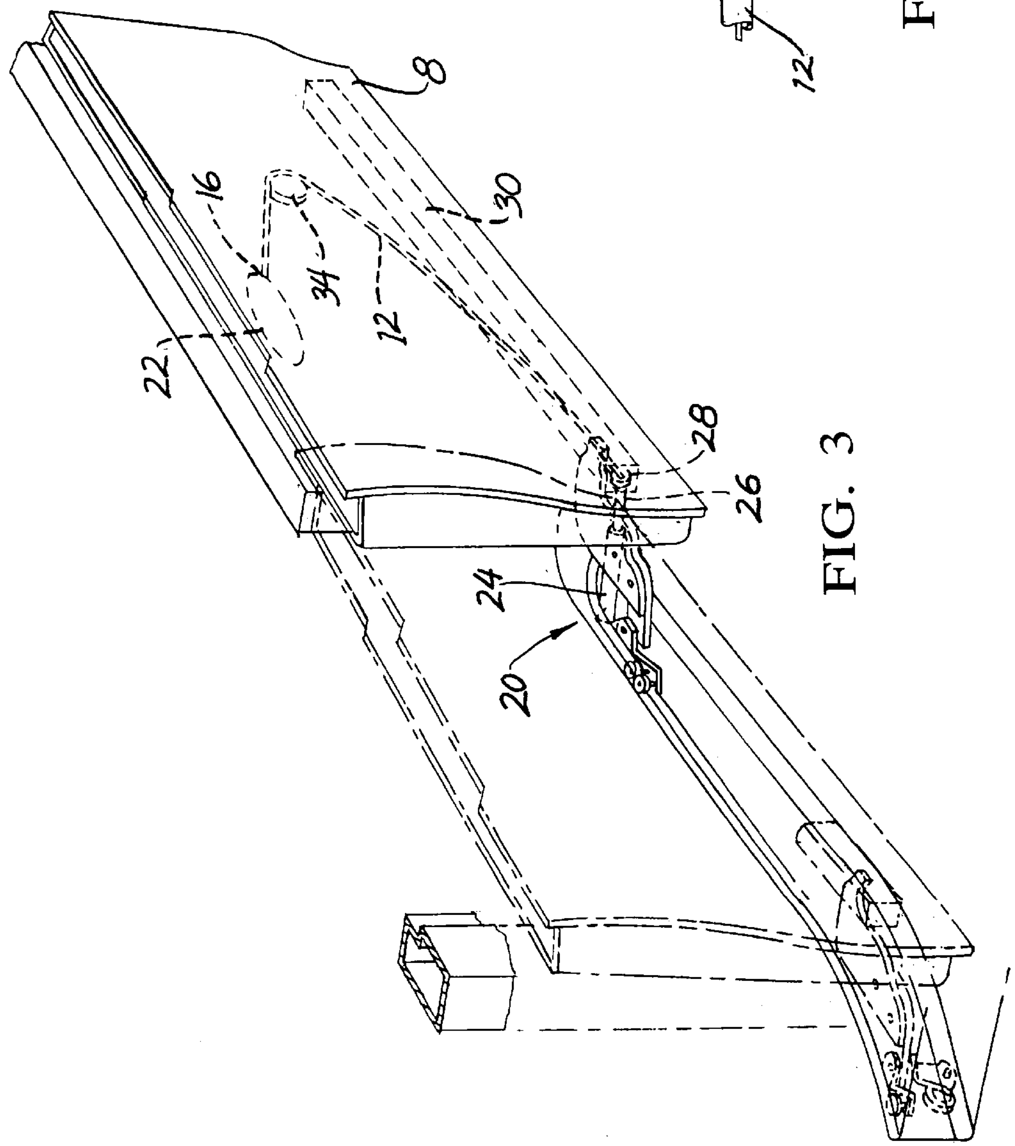
FIG. 3 is a perspective view of a portion of one embodiment of the subject invention installed in the vehicle.
Figure 6:
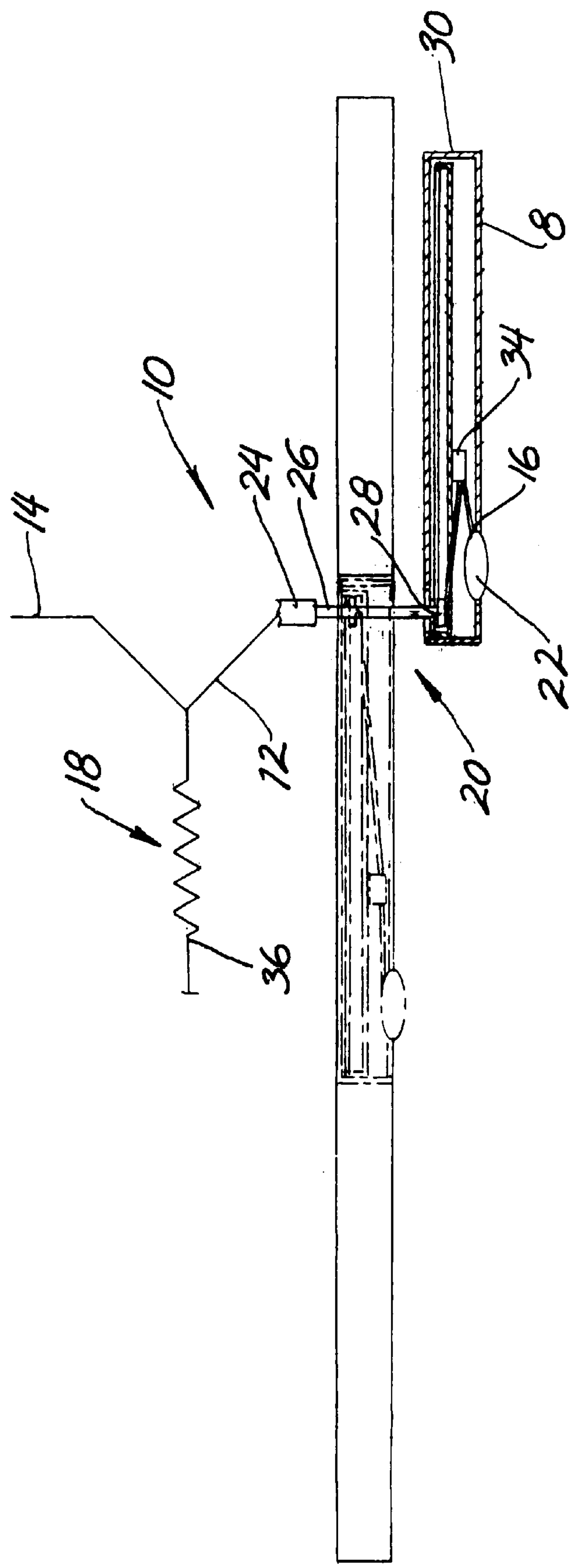
FIG. 6 is a plan view of the embodiment shown in FIG. 3 with the sliding door partially cut away.

According to one embodiment, shown in FIGS. 3–6, the bundle guide 20 includes a first sleeve 24 and a second sleeve 26 telescopingly engaging the first sleeve 24 and having an engaging end 28 adapted to engage the sliding door 8. The engaging end 28 includes an enlarged head 28 adapted to ride in an elongated track 30 in the sliding door 8. The enlarged head 28 is rotatably mounted on the second sleeve 26 to permit rotation of the head 28 relative to the second sleeve 26. The enlarged head 28 has a cylindrical shape, as shown, to facilitate this rotation—or rolling—in the track 30. As shown in FIG. 5, the track 30 could include soft, flexible flaps 32 that serve in part to cover the opening of the track 30 and retain the enlarged head 28, and also to allow for easy insertion of the head 28 in the track 30.

The wiring assembly 10 also includes a bundle pivot 34 disposed along the wire bundle 12 between the bundle guide 20, 20' and the second end 16 of the wire bundle 12. The bundle pivot 34 is adapted to attach to the sliding door 8 at a point spaced away from the second end 16 of the wire bundle 12. As shown in the figures, the bundle pivot. 34 is a projection or the like—possibly a grommet—mounted inside the sliding door body 8 to guide the bundle 12 between the bundle guide 20, 20' and the place where the bundle terminates (e.g. in an accessory 22). The exact form of the bundle pivot is not critical.

Figure 9:
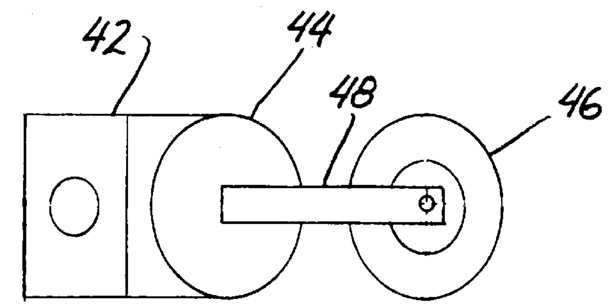
FIG. 9 is a side view of the cable support assembly.
Figure 9:
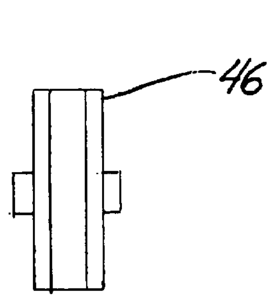
Figure 9:
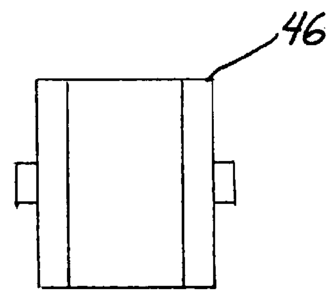
Figure 10:
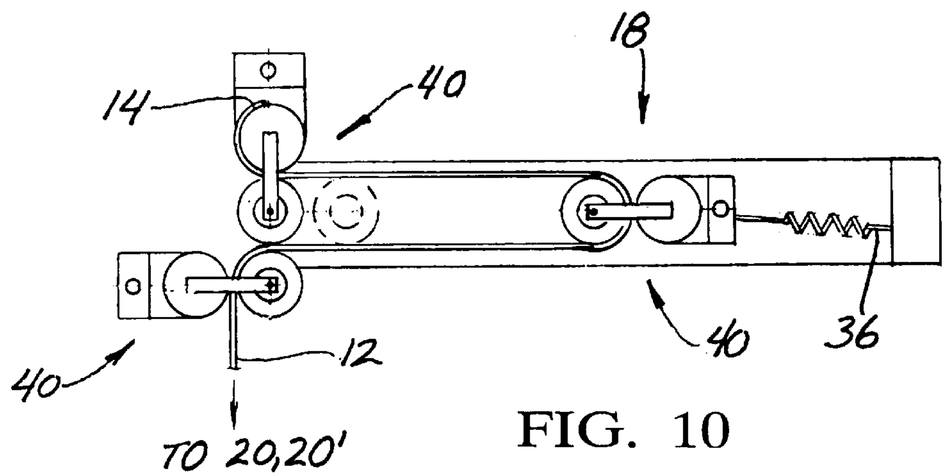
FIG. 10 shows one possible arrangement of cable support assemblies.

The aforementioned spring mechanism 18 can assume several forms. In one case it includes an extension spring 36, as well as a roller assembly 38 interconnected with the spring 36. This is shown in FIGS. 6–8 and 10. Instead of a simple roller assembly 38, the spring mechanism 18 could include at least one cable support assembly generally shown at 40, as shown in FIGS. 9 and 10. Each cable support assembly 40 includes an attachment clip 42, a radius controller 44 interconnected with the attachment clip 42, and a roller 46 interconnected with either the attachment clip 42 or the radius controller 44. In the embodiment shown, the roller 46 attaches to the radius controller 44 with one or more arms 48 that allow the roller 46 to rotate. As shown in FIGS. 9A and 9B, the roller 46 can be configured to handle a narrow, possibly tubular wire bundle (FIG. 9A) or a wide and flat wire bundle (FIG. 9B).

The purpose of having a radius controller 44 in addition to a roller 46 and an attachment clip 42 arises if the manufacturer wants to use fiber optic cables in the wire bundle 12. Most fiber optic cables cannot be bent or "radiused" beyond a given limit. If they are, they can become inoperative. The radius controller 44 ensures that fiber optic cables do not bend beyond their limit. The radius controller 44 is preferably rotatable with respect to the attachment clip 42, although it could be fixed.

In the embodiment shown in FIG. 10 there are three cable support assemblies 40 disposed along the wire bundle 12 between the first end 14 of the wire bundle and the bundle guide 20,20'. One of the cable support assemblies is attached to the spring 36 as shown. Other arrangements are possible.

The spring mechanism 18 may simply be a spring cassette that can wind the bundle 12 and unwind it on demand. This would act in place of the embodiment shown in FIG. 10, as well as the embodiment shown in FIGS. 6–8, where these embodiments rely on an extension spring 36 and not a torsion-type of spring. In any case, the spring mechanism 18 is disposed "upstream" of the bundle guide 20, 20'.

Figures 7, 8:
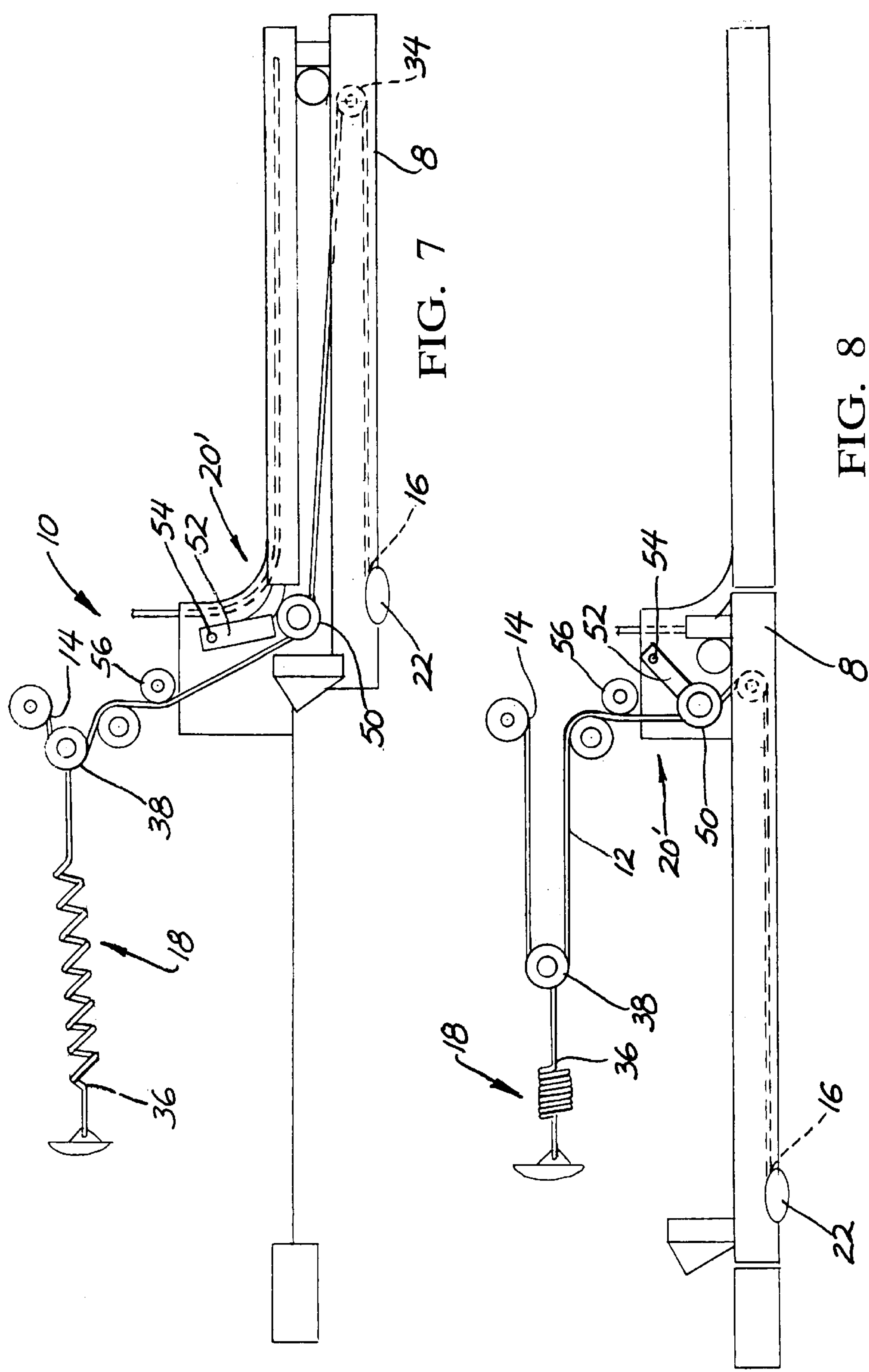
FIG. 7 is a plan view of an alternative embodiment of the invention with the sliding door open.
FIG. 8 is a plan view of the alternative embodiment with the sliding door closed.

In an alternative embodiment of the wiring assembly 10, shown in FIGS. 7–8, the bundle guide 20' includes a pulley mechanism including at least one pulley. The pulley mechanism includes a pivoting pulley 50 rotatably mounted on an elongated pivot arm 52, the pivot arm being adapted to attach in a pivoting attachment 54 to the vehicle adjacent the sliding door 8. The pulley mechanism includes a first fixed pulley 56 disposed along the wire bundle 12 between the spring mechanism 18 and the pivoting pulley 50, the fixed pulley 56 including an attachment operable to rotatably attach the fixed pulley to the vehicle. This alternative embodiment is shown in conjunction with a sliding door cable that drives the door 8 open and shut. The bundle guide 20' could be located in the same area as that cable, and enter the sliding door near the cable attachment point.

The operation of the embodiments will now be explained. In either case, the wire bundle 12 has its first end 14 attached in some manner to the vehicle—probably to some power supply source (not shown). The wire bundle 12 extends from there through the spring mechanism 18, through the bundle guide 20, 20' and into the sliding door 8. The wire bundle 12 then extends through the sliding door 8, around or through the bundle pivot 34, and terminates in some accessory such as 22. When the sliding door 8 opens, it pulls on the wire bundle 12, drawing it through the bundle guide 20, 20'. The spring mechanism 18 pays out extra length of the bundle 12.

With respect to the first embodiment shown in FIGS. 2–6, the wire bundle 12 extends through the telescoping sleeves 24, 26. When the sliding door 8 opens, the second sleeve 26 is pulled out relative to the first sleeve 24 because the engaging end 28 is disposed in the sliding door 8. The enlarged head 28 on the engaging end travels along the track 30 in the door 8, and the wire bundle 12 slides through the sleeves 24, 26 as the door 8 opens. The movement of the wire bundle 12 following the door 8 will pull on the spring mechanism 18, no matter what its form.

With respect to the second embodiment shown in FIGS. 7–8, the wire bundle 12 extends through the pulley mechanism 20', e.g. around the fixed pulley 56 and the pivoting pulley 50. When the sliding door 8 opens and it pulls on the wire bundle 12, the pivoting pulley 50 pivots outwardly (counterclockwise as shown in FIGS. 7 and 8) to support the bundle 12.

We claim:

1. A wiring assembly for a vehicle having a sliding door comprising:

a wire bundle having a plurality of cords, the wire bundle extending from a first end that is adapted to attach to the vehicle, to a second end that is adapted to attach to a predetermined position on the sliding door;

a spring mechanism having a first end attached to the wire bundle at a position spaced from the first end of the wire bundle, the spring mechanism also having a second end adapted to attach to the vehicle;

a bundle guide disposed along the wire bundle between the spring mechanism and the second end of the wire bundle, the bundle guide slidably supporting the wire bundle, the bundle guide being adapted to attach to the vehicle adjacent the sliding door, wherein the bundle guide includes a first sleeve and a second sleeve telescopingly engaging the first sleeve and having an engaging end adapted to engage the sliding door.

2. The wiring assembly of claim 1 further including a bundle pivot disposed along the wire bundle between the bundle guide and the second end of the wire bundle, the bundle pivot being adapted to attach to the sliding door at a point spaced away from the second end of the wire bundle.

3. The wiring assembly of claim 1 wherein the spring mechanism includes a spring.

4. The wiring assembly of claim 3 wherein the spring mechanism further includes a roller assembly interconnected with the spring.

5. The wiring assembly of claim 3 wherein the spring mechanism includes at least one cable support assembly, wherein each cable support assembly includes an attachment clip, a radius controller interconnected with the attachment clip, and a roller interconnected with one of the attachment clip and the radius controller.

6. The wiring assembly of claim 5 including at least two cable support assemblies disposed along the wire bundle between the first end of the wire bundle and the bundle guide.

7. The wiring assembly of claim 1 wherein the cords selectively include electrical cords and fiber optic cords.

8. The wiring assembly of claim 1 wherein the bundle guide includes a pulley mechanism including at least one pulley.

9. The wiring assembly of claim 8 wherein the pulley mechanism includes a pivoting pulley rotatably mounted on an elongated pivot arm, the pivot arm being adapted to attach in pivoting attachment to the vehicle adjacent the sliding door.

10. The wiring assembly of claim 9 wherein the pulley mechanism includes a first fixed pulley disposed along the wire bundle between the spring mechanism and the pivoting pulley, the fixed pulley including an attachment operable to rotatably attach the fixed pulley to the vehicle.

11. A wiring assembly for a vehicle having a sliding door comprising:

a wire bundle having a plurality of cords, the wire bundle extending from a first end that is adapted to attach to the vehicle, to a second end that is adapted to attach to a predetermined position on the sliding door;

a spring mechanism having a first end attached to the wire bundle at a position spaced from the first end of the wire bundle, the spring mechanism also having a second end adapted to attach to the vehicle;

a bundle guide disposed along the wire bundle between the spring mechanism and the second end of the wire bundle, the bundle guide slidably supporting the wire bundle, the bundle guide being adapted to attach to the vehicle adjacent the sliding door, wherein the bundle guide includes a first sleeve and a second sleeve telescopingly engaging the first sleeve and having an engaging end adapted to engage the sliding door, and wherein the engaging end includes an enlarged head adapted to ride in an elongated track in the sliding door.

12. The wiring assembly of claim 11 wherein the enlarged head has a cylindrical shape, and wherein the enlarged head is rotatably mounted on the second sleeve to permit rotation of the head relative to the second sleeve.

13. A wiring assembly for a sliding door comprising:

a wire bundle having a plurality of cords, the wire bundle extending from a first end to a second end that is adapted to attach to a predetermined position on the sliding door;

a spring mechanism having a first end attached to the wire bundle at a position spaced from the first end of the wire bundle, the spring mechanism also having a second end; and a bundle guide disposed along the wire bundle between the spring mechanism and the second end of the wire bundle, the bundle guide slidably supporting the wire bundle, the bundle guide having an engaging end adapted to engage the sliding door, wherein the engaging end includes an enlarged head adapted to ride in an elongated track in the sliding door.

14. The wiring assembly of claim 13 wherein the enlarged head has a cylindrical shape, and wherein the enlarged head is rotatably mounted on the second sleeve to permit rotation of the head relative to the second sleeve.

* * * * *